United States Patent
Yamamoto et al.

(10) Patent No.: US 6,781,598 B1
(45) Date of Patent: Aug. 24, 2004

(54) ENTERTAINMENT APPARATUS, IMAGE GENERATION METHOD, AND STORAGE MEDIUM

(75) Inventors: Tetsuji Yamamoto, Tokyo (JP); Koji Tada, Tokyo (JP); Isamu Hamada, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 426 days.

(21) Appl. No.: 09/722,170

(22) Filed: Nov. 24, 2000

(30) Foreign Application Priority Data

Nov. 25, 1999 (JP) .......................................... 11-335148

(51) Int. Cl.[7] ................................................ G09G 5/00
(52) U.S. Cl. ........................ 345/629; 345/420; 345/423; 345/427; 345/473
(58) Field of Search ................................ 345/419, 473, 345/420, 427, 629, 619, 623, 647, 649

(56) References Cited

U.S. PATENT DOCUMENTS

| | | | |
|---|---|---|---|
| 5,446,833 A | 8/1995 | Miller et al. | |
| 5,566,280 A | 10/1996 | Fukui et al. | |
| 5,769,718 A | 6/1998 | Rieder | |
| 6,166,744 A | * 12/2000 | Jaszlics et al. | ............. 345/629 |
| 6,226,008 B1 | * 5/2001 | Watanabe et al. | ............. 345/427 |
| 6,313,838 B1 | * 11/2001 | Deering | ....................... 345/420 |
| 6,384,820 B2 | * 5/2002 | Light et al. | ................... 345/419 |

FOREIGN PATENT DOCUMENTS

| JP | 5-242220 | 9/1993 | ............ G06F/15/15 |
|---|---|---|---|
| JP | 08-229237 | 9/1996 | |
| JP | 9-190550 | 7/1997 | |
| JP | 11-175748 | 7/1999 | ............ G06T/15/00 |

OTHER PUBLICATIONS

English translation of Japanese Office Action, Date of mail Jul. 10, 2001.
Gavin Bell, "Creating Backgrounds for 3D Games", Gamasutra, Oct. 23, 1998, pp. 1–8, XP–002264643, http://www.gamasutra.com/features/19981023/bell_01.htm.
Schenchang Eric Chen, "Quick–Time VR—An Image–Based Approach to Virtual Environment Navigation", Computer Graphics Proceedings, Los Angeles, Aug. 6, 1995, pp. 29–38, XP002250814.
Alan Watt, Chapter 16, "Image–Based Rendering and Photo–Modelling", 3D Computer Graphics, 1999, pp. 443 and 554–552, Addison Wesley XP–002264037.
European Patent Office, "European Search Report", dated Feb. 18, 2004, for Application No. 00125677.5–2216, 4 pages.

* cited by examiner

*Primary Examiner*—Mark Zimmerman
*Assistant Examiner*—Kimbinh T. Nguyen
(74) *Attorney, Agent, or Firm*—Fitch, Even, Tabin & Flannery

(57) ABSTRACT

It is intended to display, in a 3D-CG animation, a high-quality background image that is free of distortion due to a pan of a viewing camera. Pre-rendering images of three-dimensional background scenes are mapped over the inside surfaces of respective virtual spheres $70a_{k-1}$ and $70a_k$, and viewing cameras $71a_{k-1}$ and $71a_k$ are defined at the centers of the respective virtual spheres $70a_{k-1}$ and $70a_k$. When a three-dimensional model of a movable object such as a character model enters one of the virtual spheres, a region clipped by the pyramidal visual field of the viewing camera located at the center of the virtual sphere is projected onto a display screen.

16 Claims, 9 Drawing Sheets

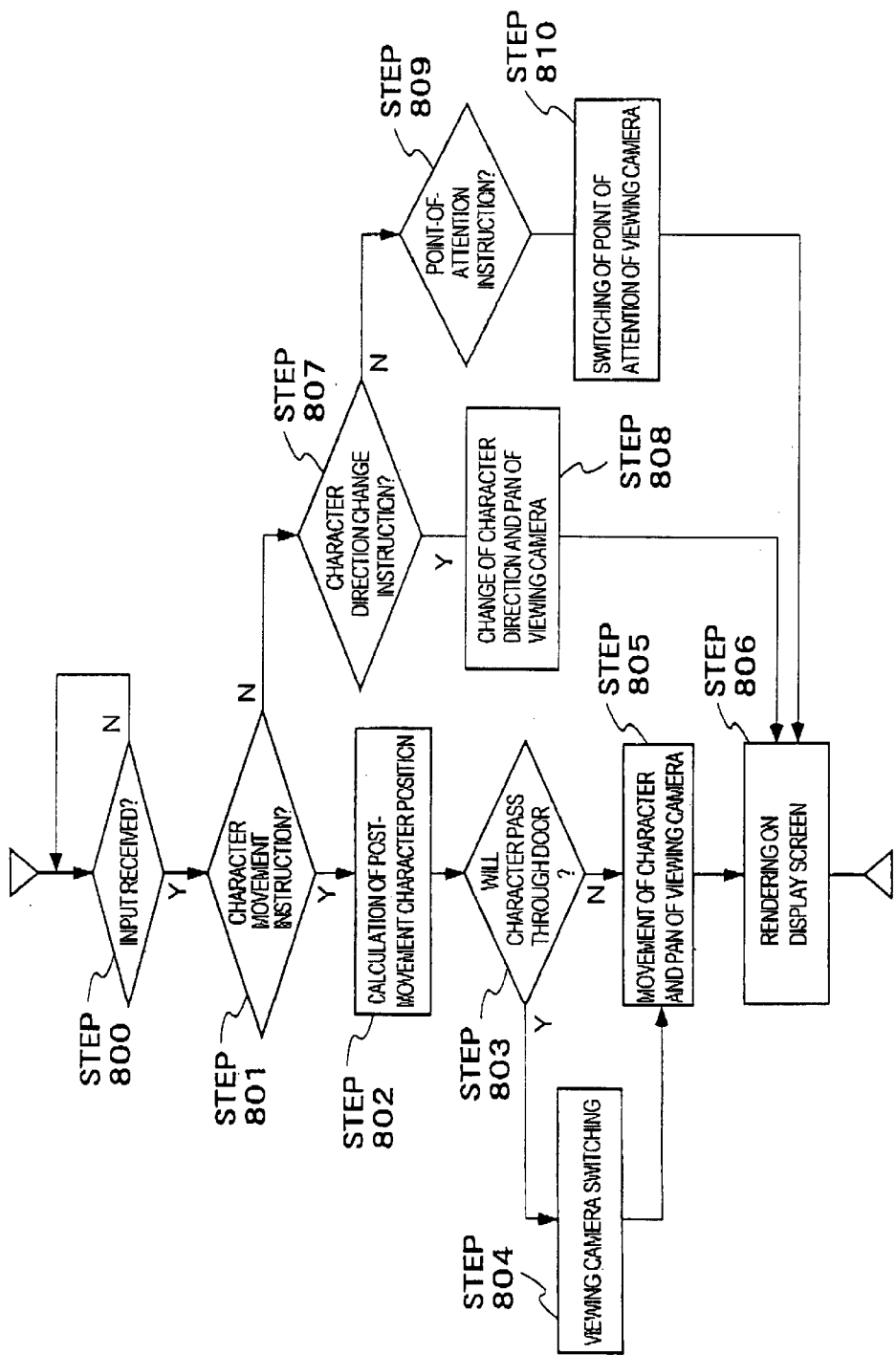

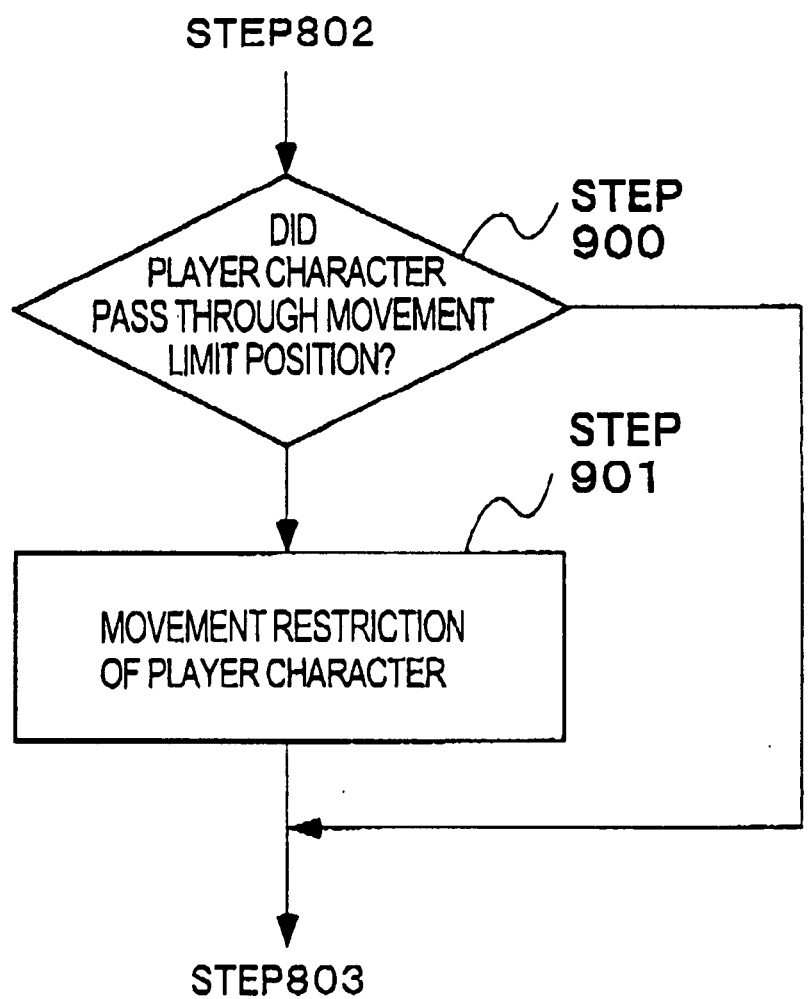

ENTERTAINMENT APPARATUS, IMAGE GENERATION METHOD, AND STORAGE MEDIUM

This application claims a priority based on Japanese Patent Application No. 11-335148 filed on Nov. 25, 1999, the entire contents of which are incorporated herein by reference for all purpose.

As shown in FIG. 1, a background of an animation of a video game or the like is generated by mapping a rendering image of a three-dimensional background scene over a virtual plane 501. A virtual viewing camera 500 is defined for the virtual plane 501. A visible region 503 or 502 that is clipped by the visual field of the viewing camera 500 is regularly subjected to rendering on the display screen of a display device. If the direction of the viewing camera 500 is changed in accordance with an input from a user, a resulting front view is displayed on the display screen of the display device in real time.

However, since a rendering image of a three-dimensional background scene is mapped over the virtual plane 501, an image on the display screen may be distorted depending on the direction of the viewing camera 500. That is, if the front side of the viewing camera 500 is directed squarely to the model plane 501 (direction (a) in FIG. 1), a proper image 503 without distortion is displayed on the display screen. However, if the viewing camera 500 is panned rightward, leftward, upward, or downward (direction (b) in FIG. 1), an image 502 whose peripheral region is distorted is displayed on the display screen.

Further, if a close-range view is included in a three-dimensional scene for generation of a rendering image to be mapped over the virtual plane 501, when, for example, the viewing camera 500 is panned, there may occur a case that a close-range-view image on the display screen is out of perspective and hence the image on the display screen seems unnatural. For this reason, usually, the above-described background image generation technique is applied to only a distant view.

SUMMARY OF THE INVENTION

The present invention relates to a computer graphics technique that is used for generation of an animation of a video game or the like. An object of the present invention is to make it possible to display a high-quality background image that is free of distortion due to a pan of a viewing camera in a 3D-CG animation.

To attain the above object, the invention provides an entertainment apparatus which operates, in accordance with an input from a controller, a subject model of operation displayed on a display screen, comprising moving image control means for moving the subject model of operation disposed inside a virtual first sphere within a predetermined moving range in accordance with an input from the controller, and for rotating a virtual viewing camera located at the center of the sphere model in accordance with the movement of the subject model of operation; and rendering means for rendering, from the virtual viewing camera, on the display screen, a model included in a region that is clipped by a visual field of the virtual viewing camera as the viewing camera is rotated, wherein a rendering image produced by rendering of a three-dimensional background scene is mapped over an inside surface of the first sphere.

It is desirable that the "rendering image produced by rendering of a three-dimensional background scene" be an image produced by (1) projecting a three-dimensional background scene onto the inside surface of a virtual sphere from a viewing point that is located at the center of a virtual sphere having the same shape as the first sphere over which the image is to be mapped, or (2) finally connecting a plurality of rendering images obtained by rotating a viewing camera defined at a prescribed position so that they are located around a virtual sphere.

In the above entertainment apparatus, a rendering image of a three-dimensional background scene is mapped to the inside surface of a virtual sphere and a viewing camera is defined at the center of the first sphere. Therefore, even if the viewing camera is panned leftward or rightward, no distortion occurs in a peripheral region of a background image on the display screen.

Even if a rendering image includes both of a close-range view and a distant view, a pan of the viewing camera in any direction does not impair the perspective of a display image on the display screen because the distance between the front side of the viewing camera and the rendering image is kept constant. Since the moving range of a subject model of operation is restricted, even if a rendering image includes a close-range view, there does not occur a case that an unnatural image such as an image in which an object as a subject of operation passes through the close-range view is displayed on the display screen.

Each means of the above entertainment apparatus may be realized by either hardware or software.

BRIEF DESCRIPTION OF THE DRAWINGS

FIGS. 9 and 10 are flowcharts showing the image process that is executed by the entertainment apparatus according to the embodiment of the invention.

DESCRIPTION OF THE PREFERRED EMBODIMENT

An embodiment of the present invention will be hereinafter described with reference to the accompanying drawings. This embodiment is directed to a case where the invention is applied to a computer entertainment apparatus capable of executing a video game etc.

Figure 1:
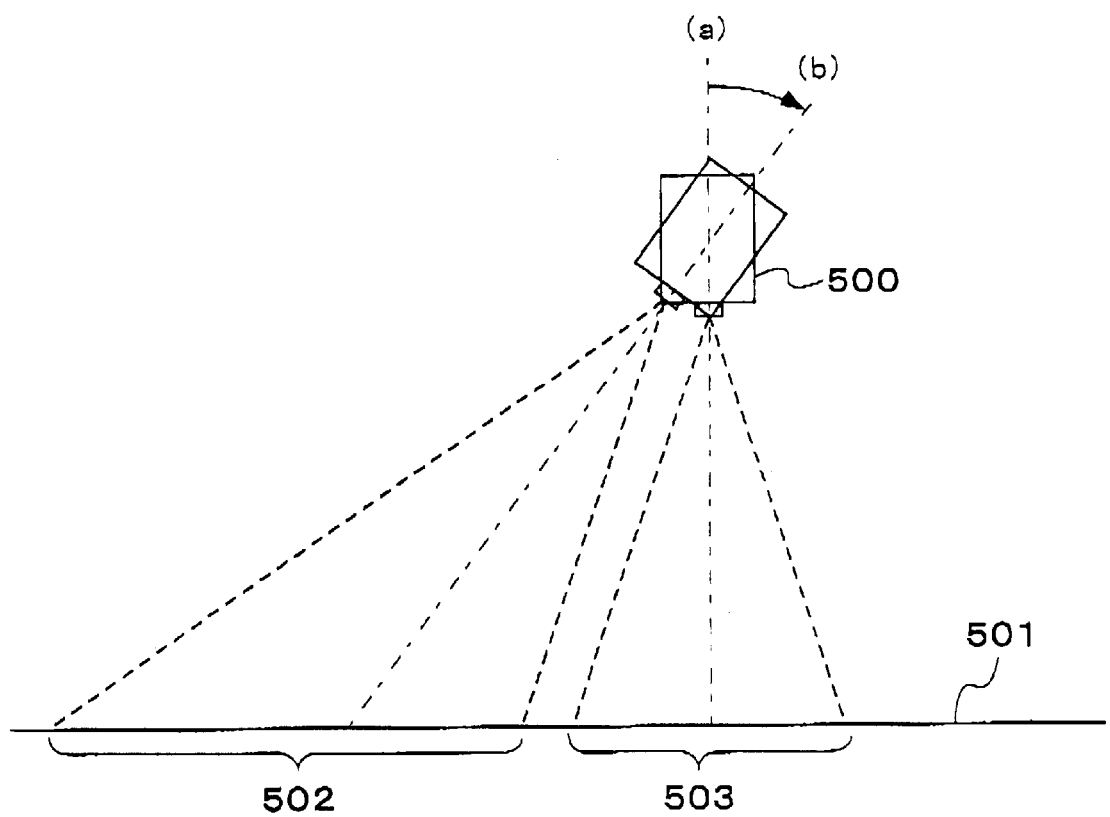
FIG. 1 illustrates problems of conventional 3D-CG animation.
Figure 2:
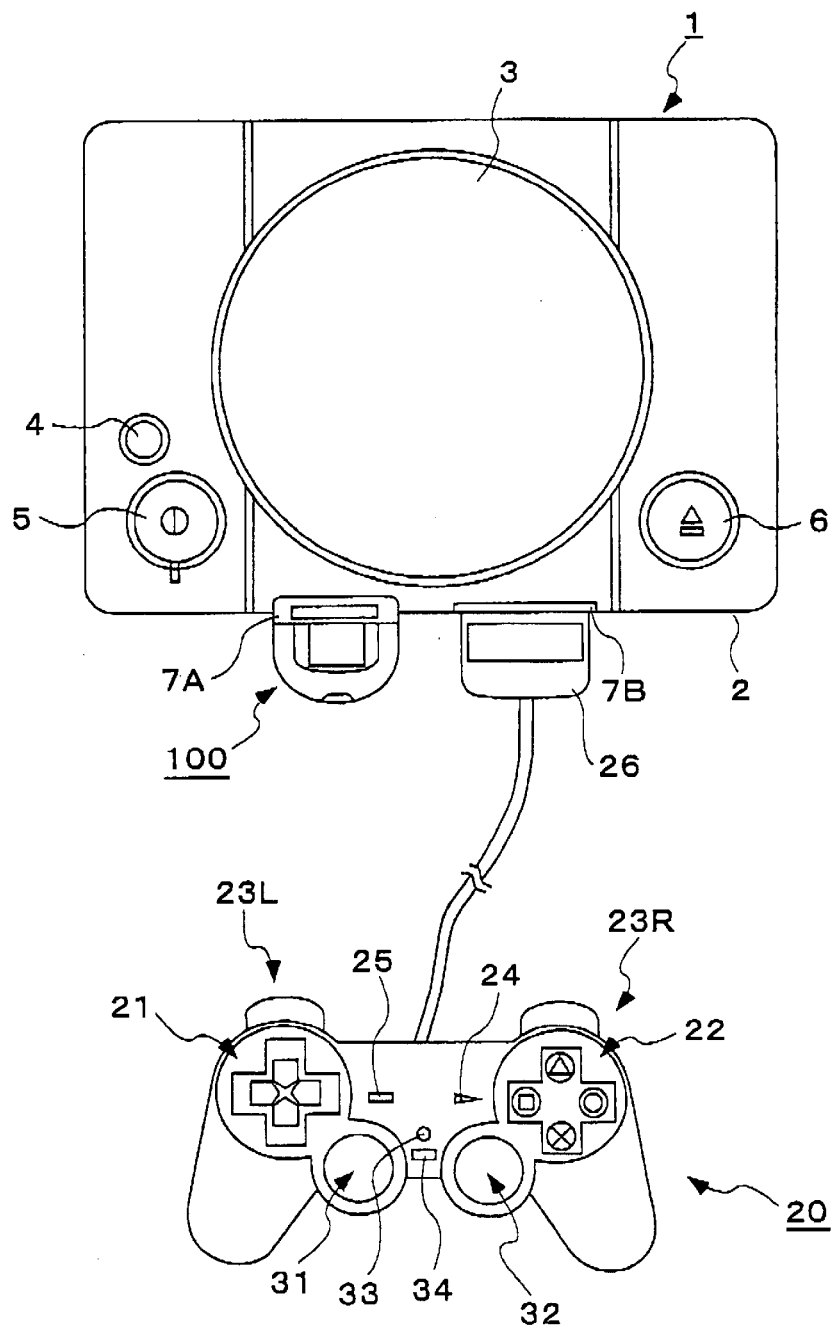
FIG. 2 shows appearances of an entertainment apparatus and a controller according to an embodiment of the present invention.

First, the configuration of an entertainment apparatus according to the embodiment will be described. FIG. 2 shows appearances of the entertainment apparatus and its peripheral device according to the embodiment.

A disc mounting section 3 of a disc drive is provided at the center of the entertainment apparatus 1. The disc mounting section 3 can mount a storage medium such as an optical disc (e.g., a CD-ROM) which stores an application program that defines processes of a video game or the like and related data (e.g., plural kinds of pre-rendering image data obtained by performing rendering of a three-dimensional background scene on the inside surface of a virtual sphere from a viewing point at the center of the virtual sphere and shape data of a mapping sphere having the same spherical surface shape as the virtual sphere).

Various switches 4–6, a plurality of slot portions (in this embodiment, two slot portions 7A and 7B), etc. are provided on the top surface of the entertainment apparatus 1. For example, the switches thus provided include a reset switch 4 for resetting a game, a power switch 5, and an open switch 6 for opening the cover of the disc mounting section 3. The slot portions 7A and 7B are provided with memory card connection portions 8A and 8B respectively (see FIG. 3) and a controller connection portion 12 (see FIG. 3). A controller 20 for accepting input from a user (player) can be connected detachably to the controller connection portion 12 of each of the slot portions 7A and 7B. Therefore, two players can play a game by connecting the connectors of two controllers 20 to the respective controller connection portions 12. An auxiliary storage device (e.g., a memory card 26) capable of loading and saving game data (e.g., setting data of a game), another portable electronic device 100, or the like can be connected to the memory card connection portions 8A and 8B of the slot portions 7A and 7B. The memory card 26 or the portable electronic device 100 can be connected to or removed from the memory card connection portion 8A or 8B with the power kept applied to the apparatus main body. Therefore, when shortage of storage capacity has occurred in the memory card 26 in a state that it is connected to the memory card connection portion 8A or 8B, the player can replace the memory card 26 being connected to the memory card connection portion 8A or 8B with a new one with the power kept applied to the apparatus main body.

Audio output terminals, a video output terminal, etc. (not shown) are provided on the back of the entertainment apparatus 1.

On the other hand, a left button 23L and a right button 23R are provided on the side of the controller 20. Two kinds of operation portions 21 and 22, a start button 24, a selection button 25, two analog operation portions 31 and 32 for accepting analog manipulations such as inclining a stick and pressing the top of the stick, and a mode selection switch 33 for selecting an analog mode (i.e., a mode in which the analog operation portions 31 and 32 work).

When any of the left button 23L, the right button 23R, the operation portions 21 and 22, the start button 24, the selection button 25, the analog operation portions 31 and 32, and the mode selection switch 33 among the above operation tools 23L, 23R, 21, 22, 24, 15, 31, 32, and 33 is operated by a game player, the controller 20 generates a detection signal of the operation. The left button 23L, the right button 23R, the operation portions 21 and 22, and the analog operation portions 31 and 32 are assigned to operations to cause movements in an image being displayed on the display screen of a display device. For example, as described later, one or more fixed positions on a pre-rendering image of a three-dimensional background scene are set as candidate positions for a point of attention. When the controller 20 generates a detection signal of a predetermined operation tool (e.g., the L button 23L), the point of attention of a viewing camera of rendering is moved to a point-of-attention candidate position corresponding to the operation tool. The keys of the operation portions 21 and 22 are assigned to respective actions of a player character being displayed on the display screen of the display device. For example, if a key that is assigned to movement of the player character is depressed by a player and the controller 20 generates a detection signal of this operation, the player character is moved in a direction assigned to the key by a distance corresponding to a depression time of the key. If a key assigned to change of the direction of the player character is depressed by the player and the controller 20 generates a detection signal of this operation, the player character being displayed on the display screen of the display device is rotated in a direction assigned to the key by an angle corresponding to a depression time of the key. Where actions of a player character are assigned to the respective operation tools in this manner, a player can operates the player character easily and quickly by a single operation. Therefore, a game can be made more enjoyable.

In FIG. 2, reference numeral 34 denotes an LED indicator that is turned on when the analog mode is selected.

Figure 3:
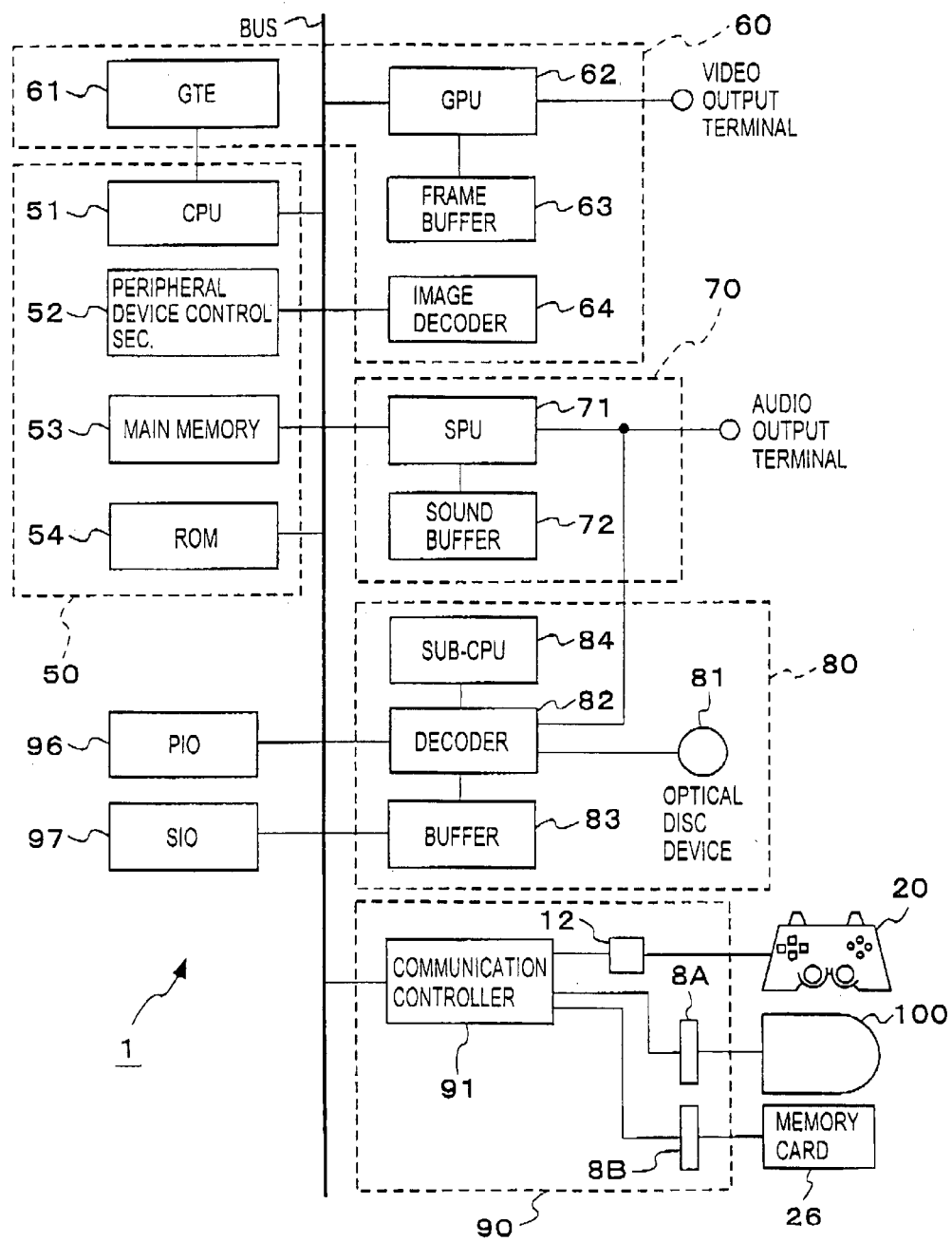
FIG. 3 shows a hardware configuration of the entertainment apparatus according to the embodiment of the invention.

FIG. 3 shows a hardware configuration of the computer entertainment apparatus 1.

The entertainment apparatus 1 includes a control system 50, a graphic system 60, a sound system 70, an optical disc control section 80, a communication control section 90, a parallel I/O interface (PIO) 96 and a serial I/O interface (SIO) 97 for connection to another apparatus, and a bus for connecting the above components to each other. The details of the systems and sections 50, 60, 70, 80, and 90 are as follows.

The control system 50 has a central processing unit (CPU) 51 for controlling the entire entertainment apparatus 1, a peripheral device control section 52 for performing various kinds of control processing (e.g., interrupt control processing and direct memory access (DMA) transfer control processing), a main memory 53 that comprises a random access memory (RAM), a read-only memory (ROM) 54 which stores control programs (programs of what is called an operating system and other programs) to be executed by the CPU 51, and other components.

When the power is applied to the entertainment apparatus 1, the CPU 51 reads the operating system from the ROM 54 into the main memory 53 and activates the operating system. As a result, control on the graphic system 60, the sound system 70, etc. is started. After activating the operating system, the CPU 51 performs initialization such as operation checks and then reads an application program from the optical disc mounted in the disc mounting section 3 into the main memory 53 and runs the application program. As a result, a game process defined by the application program is started. The CPU 51 may be a RISC-CPU, for example.

The peripheral device control section 52 performs interrupt control processing and direct memory access (DMA) transfer processing in which data transfer is directly performed, without intervention of the CPU 51, between individual components (the main memory 53, a GPU 62 an image decoder 64, a decoder 82, etc.): This reduces the load on the CPU 51 relating to data transfer, thereby increasing the speed of data transfer in program reading, image display and drawing, etc.

The graphic system 60 has a geometry transfer engine (GTE) 61, a graphic processing unit (GPU) 62, a frame buffer 63, an image decoder 64, a video output terminal, etc.

The GTE 61 performs matrix operations, vector operations, or the like in a coordinate transform in response to a request from the CPU 51. For example, in rendering a three-dimensional space, the GTE 61 performs a perspective projection that projects a three-dimensional object that is expressed approximately by a plurality of polygons onto a virtual camera screen, that is, performs a projection transform of the vertex coordinates of the plurality of polygons. If the GTE 61 is provided with a parallel operation mechanism that performs a plurality of operations in parallel, the speed of a coordinate transform can be increased, The frame buffer 63 is what is called a dual-port RAM. That is, drawing by the GPU 62 or transfer from the main memory 53 can be performed at the same time as reading for display is performed. During execution of a game, an image area for storing image information of a display image, a texture area for storing textures (e.g., a pre-rendering image of a three-dimensional background scene) to be used for texture mapping by the GPU 62 (described below), and other areas are allocated in the frame buffer 63.

The GPU 62 performs texture mapping in response to a request from the CPU 51 while utilizing the GTE 61 when necessary. By performing the texture mapping, a pre-rendering image of a three-dimensional background scene is mapped over the inside surface of a sphere having the same spherical surface shape as a virtual sphere having the three-dimensional background scene projected thereon. Further, in response to a request from the CPU 51, the GPU 62 performs processing (1) in which the GPU 62 renders three-dimensional models included in a region that is clipped by the visual field of a viewing camera that is defined in a three-dimensional space and translates resulting rendering data into pixel data on the frame buffer 63 while utilizing the GTE 61 when necessary, processing (2) in which the GPU 62 reads out the contents of the frame buffer 63, converts those into a video signal, and outputs the video signal from the video output terminal, and other processing.

Among techniques of rendering that is performed by the GPU 62, the Z buffer algorithm, the scan line algorithm, the ray tracing algorithm, or the like may be used for hidden line/hidden surface removal and the flat shading, the Gauroud shading, the ray tracing algorithm, or the like may be used for shading.

In response to a request from the CPU 51, the image decoder 64 reads out, from the main memory 53, pre-rendering image data obtained through compression and coding by orthogonal transform such as discrete cosine transform, decodes the pre-rendering image data, and stores the decoded data in the main memory 53. The regenerated image data are stored in the frame buffer 63 by the GPU 62 and used as textures to be mapped over the inside surface of the above-mentioned spherical model.

The sound system 70 has an SPU (sound processing unit) 71, a sound buffer 72 in which sound waveform data or the like are stored by the SPU 71, and an audio output terminal. The SPU 71 has an adaptive differential PCM (ADPCM) decoding function of decoding sound waveform data that were subjected to ADPCM, a regenerating function of outputting an audio signal (a musical sound, an effect sound, or the like) from the audio output terminal by regenerating sound waveform data stored in the sound buffer 72, a modulation function of modulating and regenerating sound waveform data stored in the sound buffer 72, and other functions. By using the above functions, the sound system 70 plays a role of what is called a sampling sound source for generating an audio signal (a musical sound, a sound effect, or the like) based on sound waveform data stored in the sound buffer 72.

The optical disc control section 80 has an optical disc device 81, a decoder 82, a buffer 83, and a sub-CPU 84 that is connected to the decoder 82.

The optical disc device 81 regenerates a recording signal (an application program, a sound waveform data, or the like) from the optical disc that is mounted in the disc mounting section 3. The decoder 82 decodes the regenerated signal to which error correction codes (ECCs), for example, are added. Data outputted from the optical disc device 81 are stored temporarily in the buffer 83, thereby increasing the speed of reading data from the optical disc.

Sound waveform data recorded on an optical disc include not only ADPCM data that are supplied to the SPU 71 after being decoded by the decoder 82 but also what is called PCM data obtained by analog-to-digital-converting an audio signal. Such PCM data are decoded by the decoder 82 and then outputted from the audio output terminal as an audio signal.

The communication control section 90 has a communication controller 91 to which the above-mentioned slot portions 7A and 7B are connected. The communication controller 91 controls communication between the CPU 51 and a device (the memory card 20, the portable electronic device 100, or the like) connected to the memory card connection portions 8A or 8B and between the CPU 51 and the controller 20 connected to the controller connection portion 12. The communication controller 91 contains a protective circuit for preventing electrical breakdown.

When it is necessary to save game data of a game being executed, the communication controller 91 writes the game data to the memory card 26 connected thereto, a built-in memory of the portable electronic device 100 connected thereto, or a like device under the control of the CPU 51.

According to instructions from the communication controller 91, the controller 20 that is connected to the controller connection portion 12 sequentially transmits, to the communication controller 91, by synchronous communication, signals corresponding to operations of a player, that is, signals indicating the states of the buttons 23L, 23R, 24, 25, and 33 and the operation portions 21, 22, 31 and 32. When receiving those signals, the communication controller 91 transmits signals indicating the states of the buttons and operation portions of the controller 20 to the CPU 51. As a result, the instructions of the player are inputted to the CPU 51 and the progress of a game reflects the contents of the instructions. Specifically, under the control of the CPU 51, the graphic system 60 performs rendering on a regular basis in visual regions that are clipped by the visual field of a viewing camera that is defined at the center of a background spherical model (a spherical three-dimensional model over whose inside surface a pre-rendering image of a three-dimensional background scene is mapped; described later) while changing the direction of the viewing camera in accordance with the content of an instruction from the player and displays a resulting rendering image on the display screen of a display device (e.g., a TV receiver) that is connected to the video output terminal. As a result, the background image on the display screen of the display device changes as if the point of attention moved in accordance with the instruction of the player. Further, under the control of the CPU 51, the sound system 70 causes a audio device (e.g., the speakers of a TV receiver) that is connected to the audio output terminal to output a sound.

Figure 4:
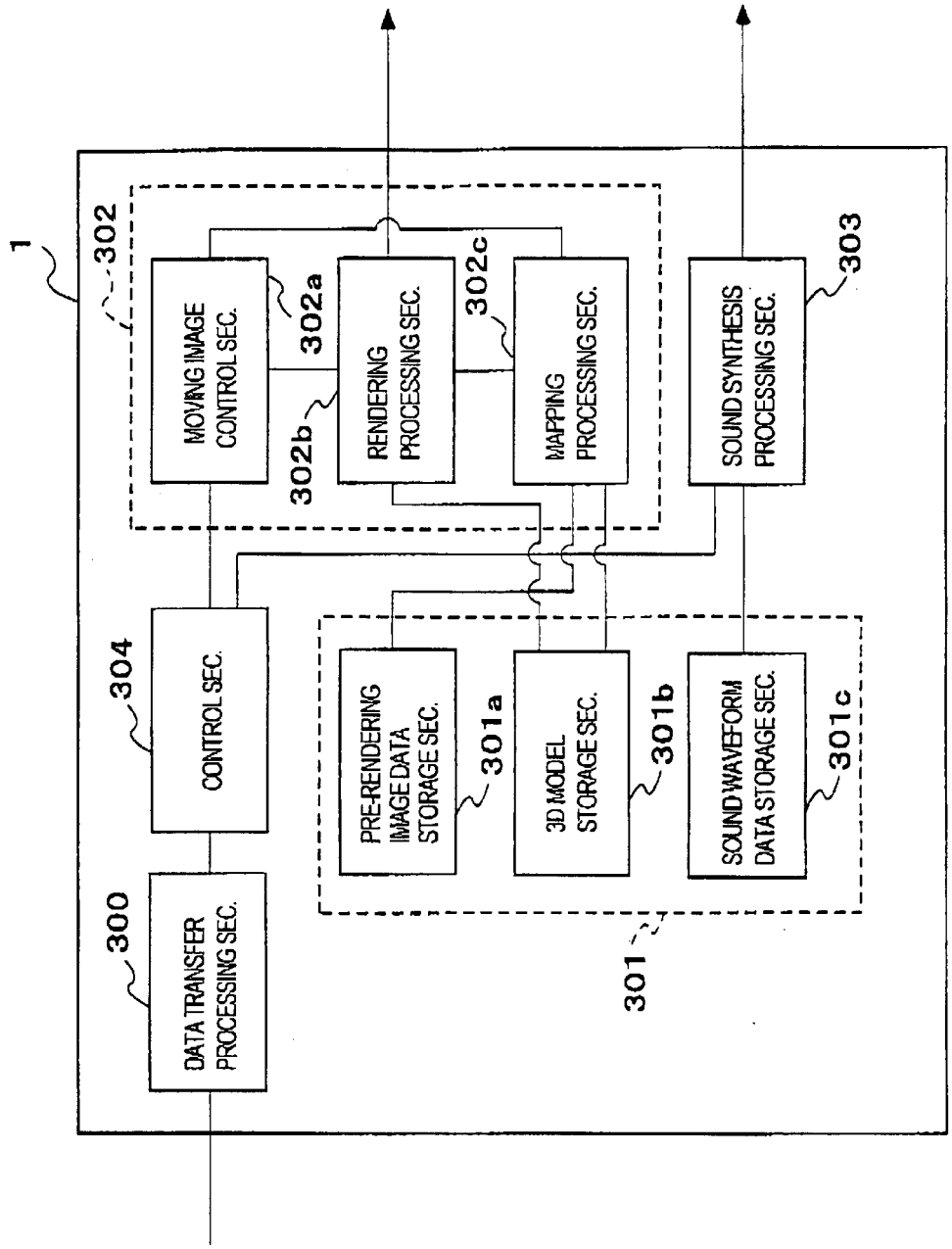
FIG. 4 shows a functional configuration of the entertainment apparatus according to the embodiment of the invention.

The above hardware configuration and an application program etc. loaded from an optical disc into the main memory 53 implement a functional configuration shown in FIG. 4 that includes a data transfer processing section 300 for controlling data transfer to or from the controller 20 or the like, a storage section 301 that holds various data that are necessary for the progress of a game, a moving image generation processing section 302 for generating a moving image based on data being held by the storage section 301, a sound synthesis processing section 303 for synthesizing a sound based on sound waveform data being held by the storage section 301, and a control section 304 for controlling the above processing sections according to the progress of a game.

The storage section 301 includes a pre-rendering image data storage section 301a, a three-dimensional model storage section 301b, and a sound waveform data storage section 301c. The sound waveform storage section 301c stores sound waveform data such as sound effects of a game. The three-dimensional model storage section 301b stores data relating to various three-dimensional objects to be disposed in a three-dimensional space, examples of which are shape data of a spherical model over whose inside surface a pre-rendering image of a three-dimensional space is to be mapped, three-dimensional models of movable objects such as a player character to appear in a game, and three-dimensional models of still objects such as a door. The pre-rendering image data storage section 301a stores two or more kinds of pre-rendering image data of three-dimensional background scenes. It is desirable that those pre-rendering image data be data generated by, for example, one of methods (1) in which a three-dimensional background scene is projected onto the inside surface of a virtual sphere having the same spherical surface shape as a mapping spherical model from a viewing point that is defined at the center of the virtual sphere, and method (2) in which a plurality of rendering images that are generated by projecting a three-dimensional background scene located in front of a viewing point defined at a prescribed position onto a virtual plane while the viewing point is rotated rightward, leftward, upward, and downward are connected to each other so as to be located on a spherical surface having the same shape as a mapping spherical model. A candidate point-of-attention position is set at one or more fixed positions on each of those pre-rendering images.

The image generation processing section 302 has a mapping processing section 302c for generating a plurality of background spherical models, a rendering processing section 302b for rendering, in real time, models that are included in region clipped by the visual field of a viewing camera that is defined at the center of a background spherical model, and a moving image control section 302a for executing a moving image control process (a viewing camera control process, a model operation process, or the like) according to an instruction from the control section 304.

The entertainment apparatus 1 implements the above functional configuration by reading an application program etc. from the optical disc mounted in the disc mounting section 3 into the main memory 53 and executing the application program. The individual processing sections of the functional configuration executes a process suitable for the story of a game. Such a process will be described below. The entertainment apparatus 1 is assumed to have the controller 20 and a TV receiver already connected thereto.

Figure 5:
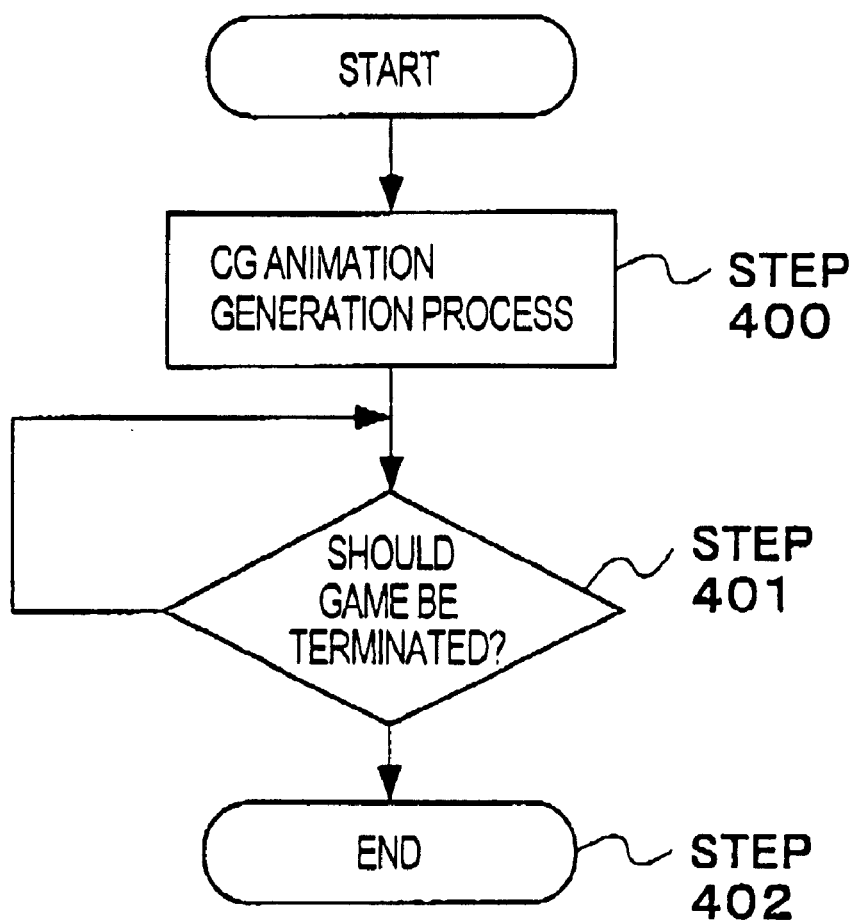
FIGS. 5 and 6 are flowcharts showing an image process that is executed by the entertainment apparatus according to the embodiment of the invention.

As shown in FIG. 5, when a game has started, first, at step 400 the control section 304 gives the image generation processing section 302 an instruction to start a 3D-CG animation generation process. In response, the image generation processing section 302 starts the CG animation generation process (see FIG. 6; described later).

During execution of the CG animation generation process by the image generation processing section 302, the control section 304 judges the game status regularly at step 401 while receiving, from the communication processing section 300, an instruction of a player, that is, an input signal that is supplied from the controller 20, and executes a game process (described later) corresponding to the input signal. If a current game status satisfies a predetermined termination condition, at step 402 the control section 304 finishes the process after causing the image generation processing section 302 to display an end message on the display screen.

Figure 6:
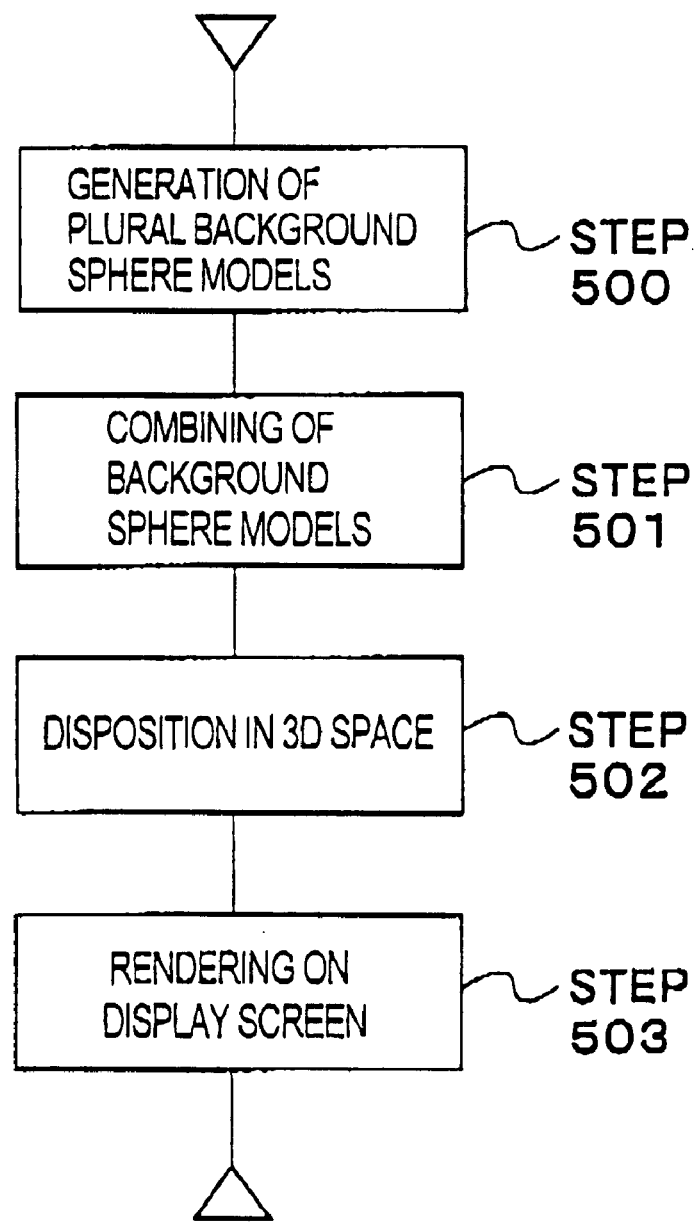

When receiving an instruction to start a CG animation generation process, the image generation processing section 302 executes the CG animation generation process shown in FIG. 6, which will be described below.

Figure 7:
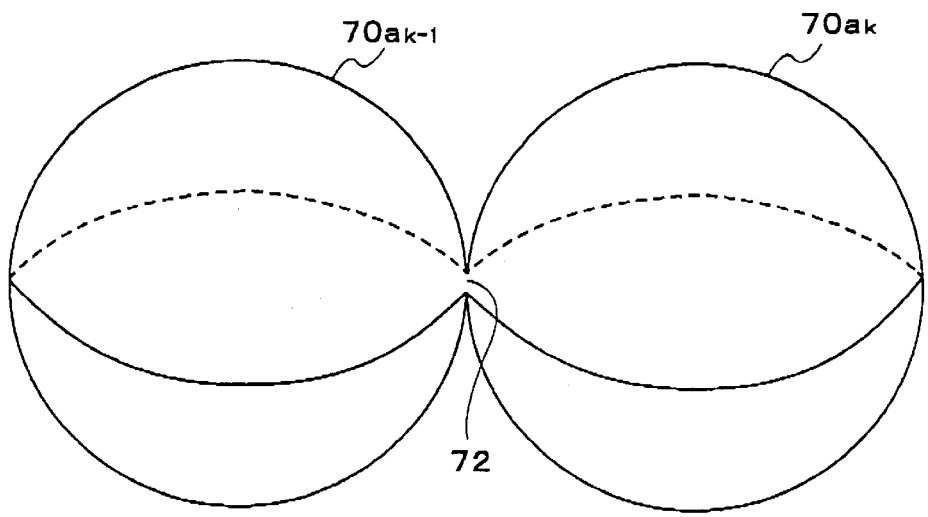
FIG. 7 conceptually shows how two background spherical models are combined with each other in the image process that is executed by the entertainment apparatus according to the embodiment of the invention.

First, at step 500, in response to an instruction from the moving image control section 302a, the mapping processing section 302c fetches predetermined, plural kinds of pre-rendering image data from the pre-rendering image data storage section 301a and fetches, from the three-dimensional model storage section 301b, shape data of a spherical model to be used for mapping of those pre-rendering image data. The mapping processing section 302c generates a plurality of background spherical models $70a_1$–$70a_n$ having different background images on their inside surfaces by mapping the respective pre-rendering images over the inside surfaces of the spherical models. At step 501, the mapping processing section 302c combines the background spherical models $70a_1$–$70a_n$ at prescribed positions and cuts out their boundary portions to form passages each of which connects the insides of adjacent background spherical models. For example, where there are two background spherical models, as shown in FIG. 7, the two background spherical models $70a_{k-1}$ and $70a_k$ are combined at one position and their boundary portions are clipped to form a passage 72 that connects the insides of the adjacent background spherical models $70a_{k-1}$ and $70a_k$. Where in this manner a plurality of background spherical models $70a_1$–$70a_n$ having background images on their inside surfaces are combined and their boundary portions are clipped, backgrounds on the closer side and the opposite side of a wall, for example, can be expressed by pre-rendering images without the need for disposing a three-dimensional model of the wall.

At step 502, in response to an instruction from the moving image control section 302a, the rendering processing section 302b disposes all the background spherical models $70a_1$–$70a_n$ at prescribed positions in a three-dimensional space that is defined by a world coordinate system. Further, the rendering processing section 302b fetches a three-dimensional model of a door from the three-dimensional model storage section 301b and disposes it at each passage, and fetches a three-dimensional model of a player character (hereinafter referred to as "player character model") from the three-dimensional model storage section 301b and disposes it at a player initial position inside a prescribed background spherical model. Still further, the rendering processing section 302b fetches other three-dimensional models, for example, three-dimensional models of another character to appear in the game, a wall, etc., from the three-dimensional model storage section 301b and disposes those at respective initial positions.

Figure 8:
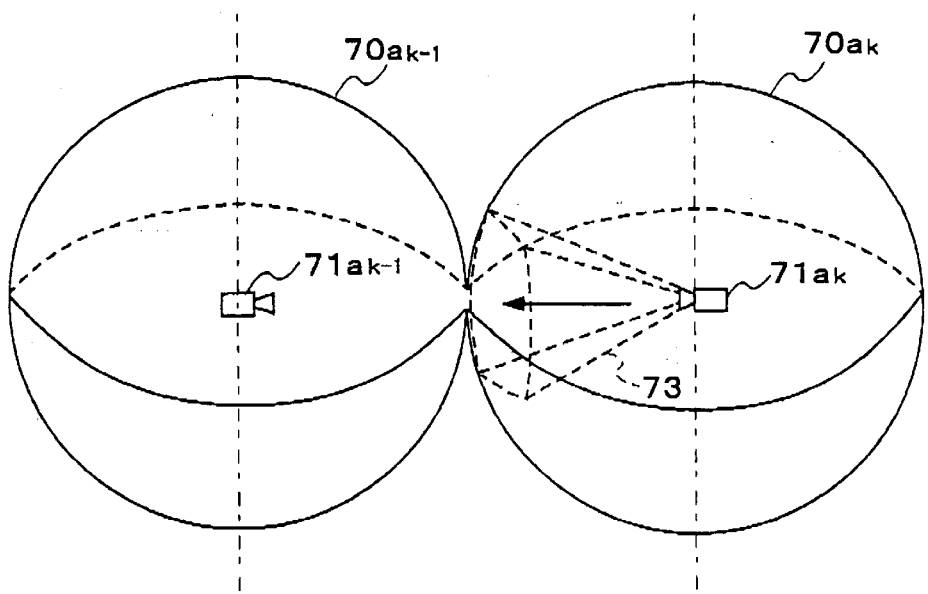
FIG. 8 conceptually shows a positional relationship between viewing cameras and background spherical models in rendering according to the embodiment of the invention.

At step 503, the rendering processing section 302b defines light sources at prescribed positions inside the respective background spherical models $70a_1$–$70a_n$ and defines viewing cameras $71a_1$–$71a_n$ at the centers of the respective background spherical models $70a_1$–$70a_n$ as shown in FIG. 8.

The rendering processing section 302b employs, as a rendering viewing camera, a viewing camera 81$a_k$ located at the center of a background spherical model 70$a_k$ having the player character model inside, and projects, onto a display screen, on a regular basis, models included in a region clipped by a pyramidal visual field 73 of the viewing camera 71$a_k$ a point of attention of which is placed in front of the player character model.

As a result, a background image having the character as a foreground image is displayed on the display screen of the display device. Where pre-rendering images of three-dimensional background scenes are used in this manner, it is sufficient to perform rendering of a background on the display screen only once. Therefore, the processing speed can be made higher than in a case where a plurality of three-dimensional objects such as buildings are disposed in a three-dimensional space to form a background. Therefore, even if the processing abilities of the GPU 62 etc. are low, a high-quality background image can be displayed quickly on the display screen in accordance with an operation of a player on the controller 20.

After start of the above CG animation generation process has been started, as described above the control section 304 accepts, via the communication processing section 300, appropriately, an input signal that is supplied from the controller 20 and executes a game process (described below) corresponding to the input signal.

As shown in FIG. 9, at step 800, during the execution of the CG animation generation process, the control section 304 waits for input of a signal from the controller 20 while supplying, for example, an audio output instruction to the sound synthesis processing section 303 when necessary. When receiving input of a signal indicating a movement direction and distance of the player character (step 801), at step 802 the control section 304 calculates a post-movement position coordinate in the three-dimensional space based on the movement direction and distance and the current position coordinate of the player character in the three-dimensional space.

At step 803, based on the calculation results, the control section 304 decides whether the moving player character will passes through the door. Only when it is decided that the moving player character will passes through the door, at step 804 the control section 304 gives a viewing camera switching instruction to the image generation processing section 302. In response, the image generation processing section 302 switches the rendering viewing camera from the current one to the one that is located at the center of the background spherical model having a post-movement position coordinate of the player character inside.

Irrespective of whether it was judged that the moving player character would pass through the door, at step 805 the total control section 304 gives a player character movement instruction and a viewing camera pan instruction to the image generation processing section 302. In response, the image generation processing section 302 executes a viewing camera control process and a model operation process. Specifically, the moving image control section 302a moves the player character in the three-dimensional space along a path connecting the current position and the position represented by the post movement position coordinate, and pans the rendering viewing camera in accordance with the movement of the player character. During the movement of the character player, at step 806 the rendering processing section 302b projects regularly, from the rendering viewing camera, models included in a region clipped by its pyramidal visual field onto the display screen.

As a result, a moving image is displayed on the display screen of the display device as if the player character moved according to an instruction of the player and the background image changed as the player character moves. Since the viewing camera is defined at the center of the background spherical model on whose inside surface a background image is mapped, the distance between the front side of the viewing camera and the sphere inside surface remains the same even if the viewing camera is directed to any direction. Therefore, no distortion occurs in a peripheral region of an image on the display screen of the display device even if the viewing camera is panned as, for example, the player character moves in accordance with an instruction of the player.

On the other hand, if it is decided at the above-mentioned decision step 801 that the input signal supplied from the controller 20 is not a signal indicating a movement direction and distance of the player character, at step 807 the control section 304 further decides whether the input signal is a signal indicating a rotation direction and angle of the player character.

If the input signal supplied from the controller 20 signal is a signal indicating a rotation direction and angle of the player character, at step 808 the control section 304 gives a player character direction change instruction and a viewing camera pan instruction to the image generation processing section 302. In response, the image generation processing section 302 executes a viewing camera control process and a model operation process. Specifically, the moving image control section 302a rotates the player character in the three-dimensional space from the current direction to a rotation direction indicated by the input signal by an angle indicated by the input signal, and pans the rendering viewing camera in accordance with the rotation of the player character. During the rotation of the character player, at step 806 the rendering processing section 302b projects regularly, from the rendering viewing camera, models included in a region clipped by its pyramidal visual field onto the display screen. As a result, a moving image is displayed on the display screen of the display device as if the player character changed its direction according to an instruction of the player and the image in front of the player character were changed as the player character changes its direction.

On the other hand, the input signal supplied from the controller 20 is not a signal indicating a rotation direction and angle of the player character, at step 809 the control section 304 further decides whether the input signal is a operation detection signal of a key that is correlated with any of the candidate point-of-attention positions. If the operation signal supplied from the controller 20 is such a key operation detection signal, at step 810 the control section 304 gives the image generation processing section 302 a point-of-attention switching instruction. In response, in the image generation processing section 302, the moving image control section 302a switches the point of attention of the viewing camera from the front position of the player character to a point-of-attention candidate position that is correlated with the key that served to output the operation detection signal by panning the rendering viewing camera. When the point of attention of the rendering viewing camera has been switched, at step 806 the rendering processing section 302c projects, regularly, models included in a region clipped by the pyramidal visual field of the rendering viewing camera from the rendering viewing camera onto the display screen. In this manner, a candidate point-of-attention position is set at fixed position that is irrelevant to the direction of the player character and when a prescribed key is operated the point of attention of the viewing camera is switched to a point-of-attention candidate position corresponding to the key. With this measure, an image is displayed on the display screen of the display device in accordance with an instruction of the player as if the player character suddenly turned his gaze to a door or the like, for example, as if a certain action is suddenly made against an opponent object hiding behind a door or the like. The point of attention may be returned from the above position to the original position after lapse of a prescribed time.

Where as described above a pre-rendering image of a three-dimensional background scene is mapped over the inside surface of a spherical model and a viewing camera is defined at the center of the spherical model, the distance between the front side of the viewing camera and the inside surface of the spherical model does not vary even if the viewing camera is directed to any direction. Where as in this case a background image is always separated from the front side of the viewing camera by the same distance even if the viewing camera is directed to any direction, a pan of the viewing camera does not impair the perspective in the background on the display screen even if both of a distant view and a close-range view are included in the background image.

Therefore, where a pre-rendering image of a three-dimensional background scene is mapped over the inside surface of a sphere, a natural background image can be displayed on the display screen of the display device by a single rendering operation. The terms "close-range view" and "distant view" as used herein are distinguished from each other by the distance from the viewing point that is employed in generating a pre-rendering image of a three-dimensional background scene, that is, the Z-axis coordinate (depth information) of a three-dimensional coordinate system that is defined, with the viewing point as a reference, in the three-dimensional space where three-dimensional objects constituting the three-dimensional background scene are disposed. Specifically, the distant view and the close-range view are distinguished from each other by using, as a reference, the position of a Z-axis coordinate that is predetermined properly in advance. For example, where the z-axis coordinate position of a three-dimensional object that is most distant from the viewing point among the three-dimensional objects constituting a three-dimensional background scene is employed as a reference, the three-dimensional object located at the reference position is made a distant view and three-dimensional objects closer than the most distant three-dimensional object are made a close-range view.

However, where a close-range view and a distant view are included in a single background image, there may occur a case that a perspective relationship between a player character and a close-range view becomes unnatural when the player character is moved because the image, which seems to be in the close-range view, is actually mapped over the inside surface of a sphere though it appears that the player character matches the close-range view. For example, there may occur a case that a player characters looks as if it were buried (partially) in a wall in a close-range-view image on the display screen of the display device. To avoid this problem, in this embodiment, when a pre-rendering image of a three-dimensional background scene including a close-range view is mapped over the inside surface of a sphere, the control section 304 executes the following process in moving a player character.

After calculating a post-movement position coordinate of the player character in the three-dimensional space at step 802 in FIG. 9, at step 900 in FIG. 10 the control section 304 decides whether the player character that has moved to the position indicated by the calculation result passed through a movement limit position that is represented by a predetermined 10 coordinate range. The term "movement limit position" means a position where a player character appears as if on the display screen of the display device it were in contact with an object that is expressed as a close-range-view image on the inside surface of a background spherical model.

If it is decided that the player character that has moved to the coordinate position calculated at step 802 in FIG. 9 did not pass through the movement limit position, the control section 304 executes step 803 and the succeeding steps in the manner shown in FIG. 9.

On the other hand, if it is decided that the player character that has moved to the coordinate position calculated at step 802 in FIG. 9 passed through the movement limit position, the control section 304 restricts the post-movement position coordinates of the player character so that he falls within the moving range. That is, at step 901, the coordinates of a movement limit position that the player character would pass through if it were moved to the coordinate position calculated at step 802 is employed as post-movement position coordinates of the player character. Then, the control section 304 executes step 803 and the succeeding steps in FIG. 9.

Where the movement of a player character in a three-dimensional space is restricted in this manner, the movement of the player character is restricted at a position where the player character looks in contact with a wall in a close-range-view image, for example. This can prevent an unnatural moving image in which the player character looks as if it were buried (partially) in a wall or the like in a close-range-view image from being displayed on the display screen of the display device.

In the above description, a background model is generated by mapping a pre-rendering image of a three-dimensional background scene over the inside surface of a spherical model during a CG animation generation process. However, the invention is not limited to such a case. For example, a background sphere model in which a pre-rendering image of a three-dimensional background scene is mapped over the inside surface in advance may be stored in a storage medium. In this case, the only processing needs to be performed is to dispose, in a three-dimensional space, a background sphere model that is read out from the storage medium. Therefore, it is not necessary that the CG animation generation process include the mapping process of a pre-rendering image of a three-dimensional background scene. That is, the mapping processing section 302c can be eliminated from the functional configuration of the apparatus.

This embodiment is directed to the case where the invention is applied to a computer entertainment apparatus capable of executing a video game. However, the scope of the invention is not limited to it. For example, the invention can broadly be applied to entertainment apparatus (including information processing apparatuses) capable of executing various application programs that are not limited to video game programs. It becomes possible to display a high-quality background image that is free of distortion due to a pan of a viewing camera in a 3D-CG animation generated by any of those apparatuses.

What is claimed is:

1. An entertainment apparatus which controls, in accordance with an input from a controller, a subject model of operation displayed on a display screen, comprising:

moving image control means for moving the subject model of operation disposed inside a virtual first sphere within a predetermined moving range in accordance with the input from the controller, and for rotating a viewing camera located at the center of the first sphere in accordance with the movement of the subject model of operation; and rendering means for rendering, from the viewing camera, on the display screen, a model included in a region that is clipped by a visual field of the viewing camera with rotation of the viewing camera, wherein a rendering image produced by rendering of a three-dimensional background scene is mapped over an inside surface of the first sphere.

2. The entertainment apparatus according to claim 1, wherein:

the first sphere is connected to a virtual second sphere over which a pre-rendering image of a three-dimensional background scene is mapped; and the moving image control means switches a viewing camera that is used for performing rendering by the rendering means to a viewing camera located at the center of the second sphere when the moving subject model of operation enters the second sphere.

3. The entertainment apparatus according to claim 1, wherein:

a point of attention that is correlated with an operation tool of the controller is defined inside the first sphere; and the moving image control means directs the viewing camera to the point of attention when the operation tool is operated.

4. The entertainment apparatus according to claim 2, wherein:

a point of attention that is correlated with an operation tool of the controller is defined inside the first sphere; and the moving image control means directs the viewing camera to the point of attention when the operation tool is operated.

5. A storage medium which stores a program for allowing an apparatus that accepts an input corresponding to an operation on a controller to execute a control process for a subject model of operation displayed on a display screen, the control process comprising:

a moving image control step of moving the subject model of operation disposed inside a virtual first sphere within a predetermined moving range in accordance with the input from the controller, and rotating a viewing camera located at the center of the first sphere in accordance with the movement of the subject model of operation; and a rendering step of rendering, from the viewing camera, on the display screen, a model included in a region that is clipped by a visual field of the viewing camera with rotation of the viewing camera, wherein a rendering image produced by rendering of a three-dimensional background scene is mapped over an inside surface of the first sphere.

6. The storage medium according to claim 5, wherein:

a point of attention that is correlated with an operation tool of the controller is defined in advance inside the first sphere; and the control process further comprises a step of directing the viewing camera to the point of attention when the apparatus receives a operation detection signal of the operation tool as an input from the controller.

7. The storage medium according to claim 5, wherein:

the first sphere is connected to a virtual second sphere over which a pre-rendering image of a three-dimensional background scene; and in the moving image control step the apparatus switches a viewing camera that is used for rendering on the display screen to a viewing camera located at the center of the second sphere when the moving subject model of operation enters the second sphere.

8. The storage medium according to claim 6, wherein:

the first sphere is connected to a virtual second sphere over which a pre-rendering image of a three-dimensional background scene; and in the moving image control step the apparatus switches a viewing camera that is used for rendering on the display screen to a viewing camera located at the center of the second sphere when the moving subject model of operation enters the second sphere.

9. An image generation method for causing an apparatus that accepts an input corresponding to an operation on a controller to control a subject model of operation in accordance with the input and to display an image of the subject model of operation on a display screen, comprising the steps of:

moving a subject model of operation disposed inside a virtual first sphere within a predetermined moving range in accordance with the input from the controller, and rotating a viewing camera located at the center of the first sphere in accordance with the movement of the subject model of operation; and rendering, from the viewing camera, on the display screen, a model included in a region that is clipped by a visual field of the viewing camera with rotation the viewing camera is rotated, wherein a rendering image produced by rendering of a three-dimensional background scene is mapped over an inside surface of the first sphere.

10. An entertainment apparatus which displays an image on a display screen in accordance with an input from a controller having an operation tool, comprising:

moving image control means for directing, when the operation tool is manipulated, a viewing camera that is used for displaying an image on the display screen to a point of attention that is defined for a background image disposed in a three-dimensional space and that is correlated with the operation tool.

11. A storage medium which stores a program for allowing an apparatus that accepts, from a controller, an input corresponding to an operation on an operation tool of the controller to execute an image process corresponding to the manipulation, the image process comprising the step of:

directing, when the operation tool is operated, a viewing camera that is used for displaying an image on the display screen to a point of attention that is defined for a background image disposed in a three-dimensional space and that is correlated with the operation tool.

12. A program for allowing an apparatus that accepts an input corresponding to an operation on a controller to execute an operation process for a subject model of operation displayed on a display screen, the control process comprising:

a moving image control step of moving a subject model of operation disposed inside a virtual first sphere within a predetermined moving range in accordance with an input from the controller, and rotating a viewing camera located at the center of the first sphere in accordance with the movement of the subject model of operation; and a rendering step of rendering, from the viewing camera, on the display screen, a model included in a region that is clipped by a visual field of the viewing camera as the viewing camera is rotated, wherein a rendering image produced by rendering of a three-dimensional background scene is mapped over an inside surface of the first sphere.

13. The program according to claim 12, wherein:

a point of attention that is correlated with an operation tool of the controller is defined in advance inside the first sphere; and the control process further comprises a step of directing the viewing camera to the point of attention when the apparatus receives a operation detection signal of the operation tool as an input from the controller.

14. The program according to claim 12, wherein:

the first sphere is connected to a virtual second sphere over which a pre-rendering image of a three-dimensional background scene is mapped; and in the moving image control step the apparatus switches a viewing camera that is used for rendering on the display screen to a viewing camera located at the center of the second sphere when the moving subject model of operation enters the second sphere.

15. The program according to claim 13, wherein:

the first sphere is connected to a virtual second sphere over which a pre-rendering image of a three-dimensional background scene is mapped; and in the moving image control step the apparatus switches a viewing camera that is used for rendering on the display screen to a viewing camera located at the center of the second sphere when the moving subject model of operation enters the second sphere.

16. A program for causing an apparatus that accepts, from a controller, an input corresponding to an operation on an operation tool of the controller to execute an image process corresponding to the operation, the image process comprising the step of:

directing, when the operation tool is operated, a viewing camera that is used for displaying an image on the display screen to a point of attention that is defined for a background image disposed in a three-dimensional space and that is correlated with the operation tool.

\* \* \* \* \*